(12) United States Patent
Gupta et al.

(10) Patent No.: US 10,142,905 B2
(45) Date of Patent: Nov. 27, 2018

(54) METHOD AND APPARATUS FOR DYNAMIC ROUTING OF LOW POWER WIDE AREA WIRELESS COMMUNICATION DEVICES

(71) Applicant: AT&T INTELLECTUAL PROPERTY I, L.P., Atlanta, GA (US)

(72) Inventors: Gaurav Gupta, Sammamish, WA (US); Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 161 days.

(21) Appl. No.: 15/247,982

(22) Filed: Aug. 26, 2016

(65) Prior Publication Data
US 2018/0063763 A1    Mar. 1, 2018

(51) Int. Cl.
*H04W 4/00*   (2018.01)
*H04W 36/22*  (2009.01)
*H04W 16/08*  (2009.01)

(52) U.S. Cl.
CPC .......... *H04W 36/22* (2013.01); *H04W 16/08* (2013.01)

(58) Field of Classification Search
CPC ....... G06F 8/65; H04W 16/08; H04W 36/165; H04W 72/048; H04W 72/0486; H04W 52/343; H04W 36/22
See application file for complete search history.

(56) References Cited

U.S. PATENT DOCUMENTS

| | | |
|---|---|---|
| 8,150,443 B2 | 4/2012 | Pedersen et al. |
| 8,660,092 B2 | 2/2014 | Min et al. |
| 8,768,376 B2 | 7/2014 | Sun et al. |
| 8,976,677 B2 | 3/2015 | Novak et al. |

(Continued)

FOREIGN PATENT DOCUMENTS

| | | |
|---|---|---|
| EP | 2611250 A1 | 7/2013 |
| EP | 2904867 | 8/2015 |

(Continued)

OTHER PUBLICATIONS

Bantu, Chandra S. et al., "Wireless Wide-Area Networks for Internet of Things", IEEE Vehicular Technology Magazine, Jan. 31, 2014, 54-63.

(Continued)

*Primary Examiner* — Kevin C. Harper
(74) *Attorney, Agent, or Firm* — Guntin & Gust, PLC; Mark Wilinski

(57) ABSTRACT

Aspects of the subject disclosure may include, for example, identifying, by a processing system including a processor, a first radio access node of a mobile communication network that is overloaded according to information associated with a plurality of narrow band wireless devices connected to the first radio access node, identifying, by the processing system, a second radio access node of the mobile communication network responsive to determining that the first radio access node is overloaded, and commanding, by the processing system, the second radio access node to increase output power to cause a first narrow band wireless device of the plurality of narrow band wireless devices to transition from connection with the first radio access node to connection with the second radio access node. Other embodiments are disclosed.

20 Claims, 9 Drawing Sheets

(56) References Cited

U.S. PATENT DOCUMENTS

| | | | |
|---|---|---|---|
| 9,026,051 B2 | 5/2015 | Qi et al. | |
| 9,125,183 B2 | 9/2015 | Kwon et al. | |
| 9,232,520 B2 | 1/2016 | Lee et al. | |
| 9,363,819 B2 | 6/2016 | Wang et al. | |
| 2006/0223545 A1* | 10/2006 | Borst | H04W 16/08 455/452.1 |
| 2012/0270593 A1* | 10/2012 | Park | H04W 52/343 455/522 |
| 2013/0244666 A1* | 9/2013 | Carmon | H04W 52/0261 455/438 |
| 2014/0098761 A1 | 4/2014 | Lee et al. | |
| 2015/0257118 A1 | 9/2015 | Siomina et al. | |
| 2015/0282036 A1 | 10/2015 | Yi et al. | |
| 2015/0365976 A1 | 12/2015 | Lee et al. | |
| 2016/0127936 A1 | 5/2016 | Chatterjee et al. | |
| 2016/0135143 A1* | 5/2016 | Won | H04W 72/005 370/312 |
| 2017/0265156 A1* | 9/2017 | Xue | H04W 56/001 |

FOREIGN PATENT DOCUMENTS

| | | |
|---|---|---|
| GB | 2510141 A | 7/2014 |
| JP | 2016502359 A | 1/2016 |
| JP | 2016502814 | 1/2016 |
| KR | 20110072063 | 6/2011 |
| WO | WO2015200804 | 12/2015 |
| WO | WO2016048522 | 3/2016 |
| WO | WO2016073591 | 5/2016 |

OTHER PUBLICATIONS

Kalalas, Charalampos, "Cellular Communications for Smart Grid Neighborhood Area Networks: A Survey", IEEE Access, vol. 4, Apr. 29, 2016, 1469-1493.

Laya, Andres et al., "Goodbye, Aloha!", IEEE Access, vol. 4, May 23, 2016, 2029-2044.

Marwat, Safdar et al., "A Novel Machine-to-Machine Traffic Multiplexing in LTE—A System Using Wireless In-band Relaying", International Conference on Mobile Networks and Management. Springer International Publishing, 2013., 2013, 1-10.

Masek, Pavel et al., "Influence of M2M Communication on LTE Networks", Sbornik prispevku studentske konference Zvule. vol. 1. 2014., 2014, 1-4.

* cited by examiner

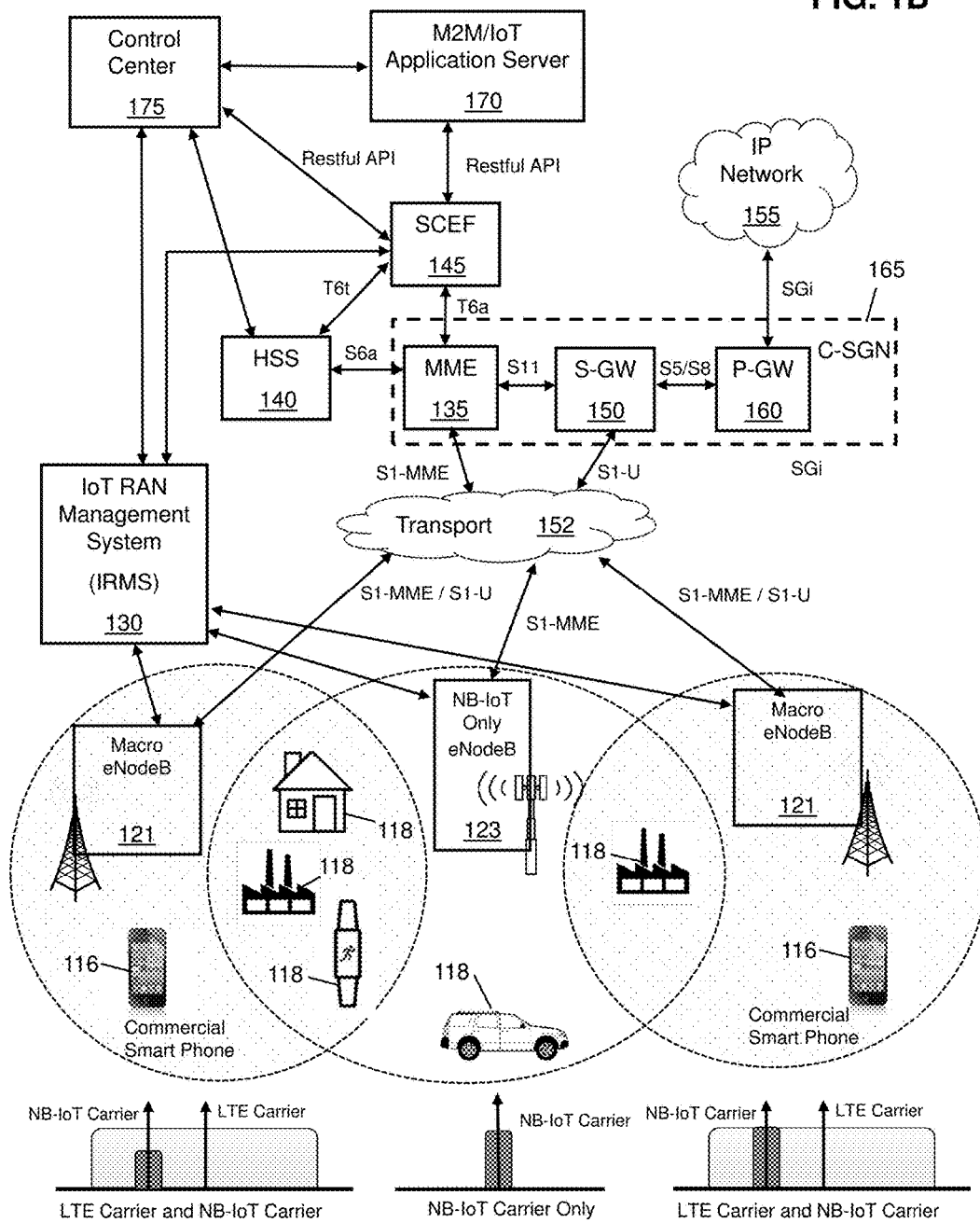

METHOD AND APPARATUS FOR DYNAMIC ROUTING OF LOW POWER WIDE AREA WIRELESS COMMUNICATION DEVICES

FIELD OF THE DISCLOSURE

The subject disclosure relates to a method and apparatus for dynamic routing of wireless communication devices.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein:

FIG. 1A-1D depict illustrative embodiments of a system for controlling routing for data delivery to narrow band communication devices in a mobile communication network;

DETAILED DESCRIPTION

Figure 1A:
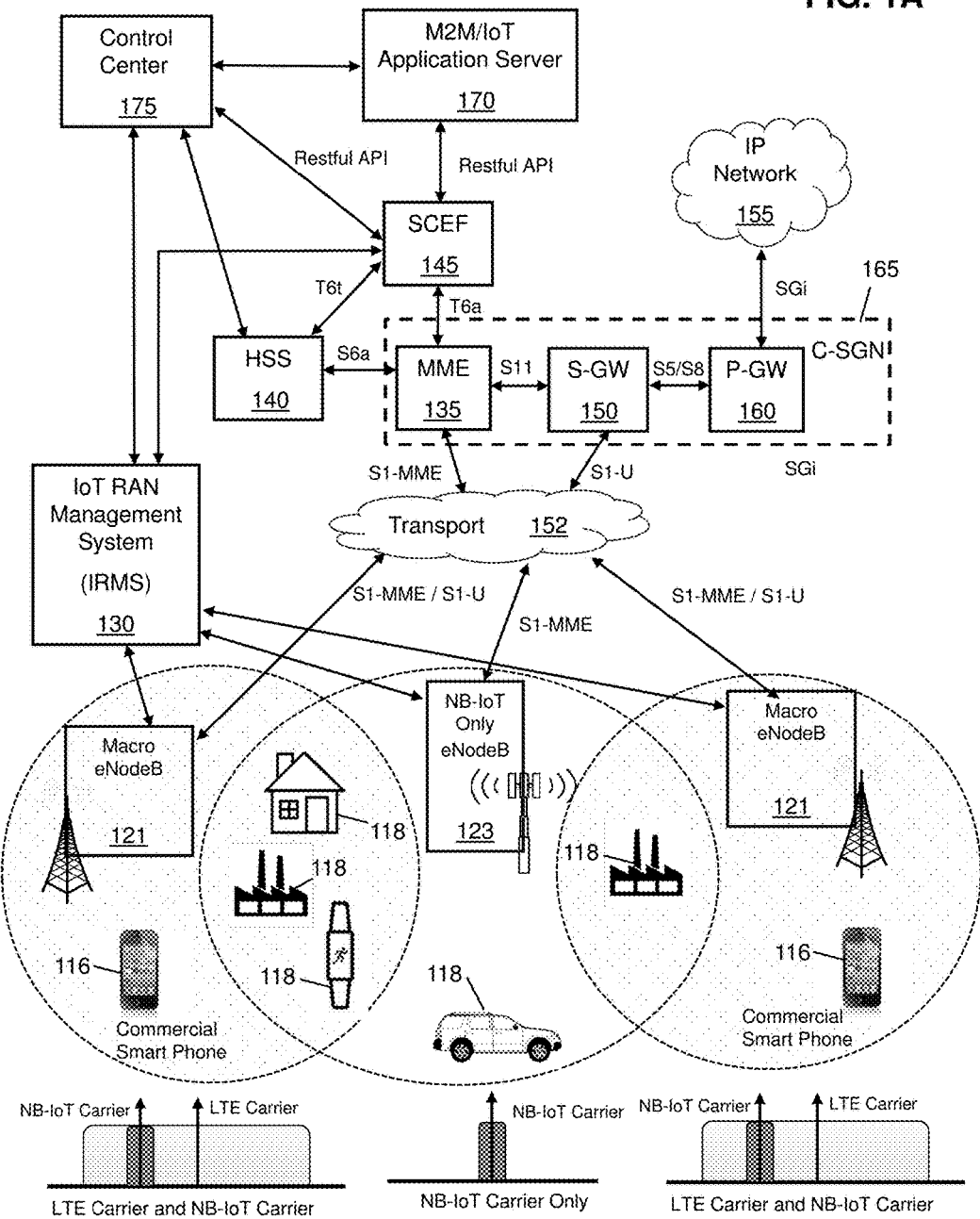

The subject disclosure describes, among other things, illustrative embodiments for routing communications of wireless devices. Internet of Things (IoT) devices, or Machine-to-Machine (M2M) devices can be wirelessly connected to the Internet via a mobile communication network. The mobile communication network can use narrow bandwidth communications, where only a narrow slice of the allocated bandwidth at a given frequency is required to fulfill the functional needs of the devices, which can be called Narrow Band IoT (NB-IoT) devices. The mobile communication network can include radio access nodes, such as eNodeB nodes that can provide the air-to-air link between the core of the mobile communication network and the wireless devices. The eNodeB nodes can support wide frequency band, or LTE carrier, wireless communications to connect with, for example, standard smart phone devices. The eNodeB nodes can support the narrow frequency band, or NB-IoT carrier, wireless communications to connect with NB-IoT devices, such as wireless utility meters, machine installations, thermostats, and the like. The mobile communication network can include some eNodeB nodes, called Macro eNodeB nodes, which support both LTE carrier and NB-IoT carrier communications simultaneously. The mobile communication network can include other eNodeB nodes that only support the NB-IoT carrier, called NB-IoT Only eNodeB nodes.

The mobile communication network can provide a data path between NB-IoT wireless devices and Internet-based application servers. In addition to saving allocated radio bandwidth by connecting to the NB-IoT devices via the NB-IoT carrier, the mobile communication network can also provide NB-IoT device data paths that minimally impact LTE data paths, which are used by commercial smart phone devices. To achieve this, the mobile communication network can assign NB-IoT user data communications to the LTE control plane rather than the LTE user plane (as is typical for LTE user data). A Service Capability Exposure Function (SCEF) server can coordinate data transfers between the NB-IoT devices and the application servers via Mobility Management Entity (MME) nodes that are assigned to the NB-IoT devices thus avoiding the typical Packet Data Network (PDN) user plane that includes a Serving Gateway (S-GW) and a PDN Gateway (P-GW).

The mobile communication network can include an IoT Radio Access Node Management System (IRMS) that can monitor current and expected narrow frequency band loading on the radio access nodes, such as the Macro eNodeB and the NB-IoT Only eNodeB. For example, the IRMS can poll Macro eNodeB nodes in a local area or region to determine how many NB-IoT devices are connected to each Macro eNodeB and, in turn, to determine if any of the Macro eNodeB nodes is serving an excessive number of NB-IoT devices. In another example, the IRMS can monitor information for one or more application servers to determine if an upcoming data download event (i.e., data flow from the application server to the NB-IoT device) may create a potentially large aggregate data flow—when the download is multiplied over a large number of connected NB-IoT devices—that can overload the capabilities of one or more Macro eNodeB nodes. If the IRMS detects these or any other overloading conditions on the Macro eNodeB nodes, the IRMS can correct the imbalance by offloading all or part of the NB-IoT devices to one or more NB-IoT Only eNodeB nodes that are in the area (if available). The IRMS can direct the overloaded Macro eNodeB node to decrease a power level for the NB-IoT carrier signal that the Macro eNodeB is transmitting to its coverage area. The IRMS can direct an available NB-IoT Only eNodeB to increase a power level of the NB-IoT carrier signal that the NB-IoT Only eNodeB is transmitting to its coverage area. Assuming that the coverage areas are in close proximity (or overlapping), the adjustment of one or both of the NB-IoT carrier signals can cause NB-IoT devices in the area to be handed over from the Macro eNodeB to the NB-IoT Only eNodeB. As a result, the loading on the Macro eNodeB is reduced, and data transfers, such as the upcoming data transfer from the application server to the NB-IoT devices will be accomplished efficiently and without disrupting LTE communications. The process can be reversed to move NB-IoT devices back to the Macro eNodeB nodes at a later time. Other embodiments are described in the subject disclosure.

One or more aspects of the subject disclosure include server, including a processing system including a processor and a memory that stores executable instructions that, when executed by the processing system, facilitate performance of operations, including identifying a plurality of narrow band wireless devices connected to a first radio access node of a mobile communication network according to statistics associated with the first radio access node. The operations can include determining a projected loading for the first radio access node to provision the plurality of narrow band wireless devices with an expected software/firmware upgrade. The operations can also include determining whether the first radio access node is overloaded according to the projected loading. The operations can include identifying a second radio access node of the mobile communication network responsive to determining that the first radio access node is overloaded, wherein the second radio access node supports narrow band wireless devices and wherein the second radio access node is proximate to the plurality of first radio access node. The operations can also include commanding the second radio access node to increase output power to cause a first narrow band wireless device of the plurality of narrow band wireless devices to transition from connection with the first radio access node to connection with the second radio access node.

One or more aspects of the subject disclosure include a machine-readable storage medium, including executable instructions that, when executed by a processing system including a processor, facilitate performance of operations at a server, including receiving information associated with a first radio access node of a mobile communication network, wherein the information describes a plurality of narrow band wireless devices that are connected to the first radio access node. The operations can include determining that the first radio access node is overloaded according to the information associated with the first radio access node. The operations can also include identifying a second radio access node of the mobile communication network that supports narrow band wireless devices responsive to determining that the first radio access node is overloaded. The operations can include commanding the second radio access node to increase output power to cause a first narrow band wireless device of the plurality of narrow band wireless devices to transition from connection with the first radio access node to connection with the second radio access node.

One or more aspects of the subject disclosure include a method including receiving, by processing system including identifying, by a processing system including a processor, a first radio access node of a mobile communication network that is overloaded according to information associated with a plurality of narrow band wireless devices connected to the first radio access node. The method can include identifying, by the processing system, a second radio access node of the mobile communication network responsive to determining that the first radio access node is overloaded. The method can also include commanding, by the processing system, the second radio access node to increase output power to cause a first narrow band wireless device of the plurality of narrow band wireless devices to transition from connection with the first radio access node to connection with the second radio access node.

In FIGS. 1A-D, a mobile communication system 100 is illustrated that can provide wireless communication services, including voice, video and/or data services to wireless communication devices 116 and 118. The system 100 can be a simplified version of a larger mobile communications network. System 100 can enable wireless communication services for various devices over various networks. For example, the wireless communication devices can include mobile communication devices 116, such as cellular phones, smart phones, and/or personal data devices. The wireless communication devices can include stationary devices and mobile devices, devices that are capable of telephony and devices not capable of telephony, devices with user interfaces and displays, and devices that do not includes means for user interaction. For example, the wireless communication devices can include Internet of Things (IoT) devices 118 that are intended to provide Machine-to-Machine (M2M) communications without user input. The IoT devices 118 can include, for example, sensors, meters, location detectors, security monitors, and other machines that can provide information without human intervention. The system 100 can connect human-interfaced mobile communication devices 116 and IoT devices 118 to a common mobile communication network that can provide further interconnectivity to an IP Multimedia Subsystem (IMS) network, the Internet Network 155, a Public Switched Telephone Network (PSTN), and/or other networks.

In one or more embodiments, the IoT devices 118 can be fixed location machines with wireless communication capabilities, such as vending machines, utility meters, and monitoring devices that can advantageously communicate through the wireless capabilities of the system 100. In one or more embodiments, the IoT devices 118 can be Narrow Band Internet of Things (NB-IoT) devices, or NB-IoT devices 118, which can exhibit characteristics of intermittent data transfer activity and the use of a narrow frequency bandwidth of the available wireless data channel. The NB-IoT devices 118 can been movable from location to location, while remaining wirelessly connected to the system 100 via various wireless communication assets of the system 100. The NB-IoT devices 118 can, alternatively, remain in fixed locations with respect to the wireless communication assets of the system 100 so that, effectively, the NB-IoT devices 118 can rely on specific wireless communication assets of the system 100.

In one or more embodiments, in addition to the wireless communication devices 116 and 118, the system 100 can include eNodeB nodes 121 and 123, which can provide air-to-air, wireless connection between the wireless communication device 116 and 118 and the mobile communication network. In one embodiments, the eNodeB nodes 121 and 123 can communicate with the mobile communication network via a transport layer 152. In one or more embodiments, the eNodeB nodes 121 and 123 can include an air interface to an LTE-Uu network and can include network interfaces S1-MME and/or S1-U to a Mobility Management Entity (MME) 135 and/or a Serving Gateway (S-GW) 150. In one embodiment, the air interface can support an E-UTRAN-based LTE-Uu network, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface can enable the eNodeB nodes 121 and 123 to receive requests for connection to the system 100 from various types of wireless communication devices, including smart phone devices 116 and NB IoT devices 118.

In one or more embodiments, some of the eNodeB nodes 121, called Macro eNodeB nodes 121, can support wide frequency band, or LTE carrier, wireless communications to connect with, for example, standard smart phone devices 116. The Macro eNodeB nodes 121 can also support narrow frequency band, or NB-IoT carrier, wireless communications to connect with NB-IoT devices 118, such as wireless utility meters, machine installations, thermostats, and the like. Other eNodeB nodes 123, called NB-IoT Only eNodeB, can be configured to only support narrow frequency band, or NB-IoT carrier, wireless communications to connect with NB-IoT devices 118.

In one or more embodiments, the wireless communication device 116 can carry many traffic types, including IP-based packet data network (PDN) traffic and non-IP PDN traffic. An E-UTRAN-based LTE-Uu network can include one or more eNodeB nodes 121 and 123 on the network that can be connected to each other via X2 interfaces and which can be further connectable to the network 100 via an S1-C interface, an S1-MME interface, and/or an S1-U interface. For example, an E-UTRAN-based LTE-Uu can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, the system 100 can include one or more Radio Access Networks (RAN) or Radio Access Technologies (RAT) for interfacing the eNodeB nodes 121 and 123 with the wireless communication devices 116 and 118. In one embodiment, the system 100 can utilize a Universal Terrestrial Radio Access Network (UTRAN) 120 capable of supporting a wireless interface to a wireless communication device 116 or 118 in a Third Generation Wireless Mobile Communication Technology (3G) system. In this example, the wireless communication device 116 can support 3G IoT user equipment (3G IoT UE). In one embodiment, the system 100 can include a Long-Term Evolution (LTE) Radio Access Technology (RAT) network, or an LTE-Uu network, such as an Evolved UMTS Terrestrial Radio Access Network (E-UTRAN), a Universal Mobile Telecommunications System (UMTS), a Global System for Communications (GSM) network, an Evolution Data Only (EVDO) network, or a Code Division Multiple Access (CDMA) network. An LTE-Uu network can provide radio communication assets for wireless connectivity between a wireless communication device 116 and a Mobile Packet Core (MPC) of the system 100. The LTE-Uu network 122 can utilize a number of interfaces, including Iu, Uu, Iub and/or Iur.

In one or more embodiments, the system 100 can also include a Service Capability Exposure Function (SCEF) 145 for providing non-IP PDN data paths between NB-IoT devices 118 and one or more M2M/IoT Application Servers (AS) 170. In one or more embodiments, a Mobility Management Entity (MME) 135, Serving Gateway (S-GW) 150, and PDN Gateway (P-GW) 160 can form a Cellular IoT Serving Gateway Node (C-SGN) 165 that can provide an IP, user plane PDN path to the AS 170. In one or more embodiments, the network 100 can be a cellular IoT core network that can facilitate connection of mobile communication devices 116 and/or NB-IoT devices 118 to the cellular IoT serving gateway node (C-SGN) 165. In various embodiments, the C-SGN 165 can be a collapsed version of an evolved packet core network and can include MME 135, S-GW 150, and P-GW 160.

In one or more embodiments, the eNodeB nodes 121 and 123 can perform operations consistent with the 3GPP standard. For example, a Macro eNodeB 121 can request attachment of an NB-IoT device 118 to the network 100. The Macro eNodeB 121 can forward a connection request from the NB-IoT device 118 to the MME 135. An authentication request for the NB-IoT device 118 can flow to the MME 135, for example, via a Non-Access Stratum (NAS) protocol message. The NAS protocol authentication request can flow directly from the NB-IoT device 118 to the MME 135, via a tunneling protocol (GTP) link between Macro eNodeB 121 and the MME 135. At the MME 135, the authentication request can be converted to an Internet Engineering Task Force (IETF) standard authentication message protocol, such as the Diamond protocol. The converted, authentication message in the Diamond protocol can be forwarded to a Home Subscription Service (HSS) server 140 for verification of the authentication request for the NB-IoT device 118. In one embodiment, when the NB-IoT device 118 is booted up, it can send an attach request or an authentication request to the MME 135 via Macro eNodeB 121.

In one or more embodiments, the Home Subscriber Server (HSS) 140 can provide a central database that contains user-related and subscription-related information. The functions of the HSS 140 can include mobility management, call and session establishment support, user authentication and access authorization. In one embodiment, the HSS 140 can manage subscription-related information in real time, for multi-access and multi-domain offerings in an all-IP environment. The HSS 140 can be based on Home Location Register (HLR) and Authentication Center (AuC).

Upon powering up, the NB-IoT device 118 can attach to a RAN, which can include the LTE-Uu and the Macro eNodeB node 121 or the NB-IoT Only eNodeB 123. Further, the NB-IoT device 118 can seek to attach to the system 100 via a serving MME 135 that is within a given geographic coverage area, typically of a local RAN. In one or more embodiments, if the NB-IoT device 118 does not have any type of activity over a certain time period, then the NB-IoT device 118 can enter into an IDLE mode in order to preserve its battery life. In one embodiment, the NB-IoT device 118, the Macro eNodeB node 121 or the NB-IoT Only eNodeB 123, and the MME 135 can support an extended IDLE mode DRX capability that can save radio transmission power, as well as further extend the battery life of the device 118. An internal or external trigger can cause the NB-IoT device 118 to transmit data. In this case, the NB-IoT device 118 may need to establish a data connection to be able to engage in data transfer with the network 100 and/or a target application service (AS) 170 and/or a target application provider.

In one or more embodiments, during an attach attempt and/or during a PDN connectivity procedure for a NB-IoT device 118, the serving MME 135 can request an authentication of the NB-IoT device 118. The MME 135 can initiate the authentication with the assistance of the HSS 140 of the system 100. Upon successfully authenticating of the NB-IoT device 118, the MME 135 can select a service capability exposure function (SCEF) 145 that can act as a gateway towards the external application server (AS) provider 170 for non-IP PDN communications with the AS 170 via the control plane.

In one or more embodiments, if a mobile communication device 116 is being authenticated and connected to the network 100, then the HSS 140 can return a successful authentication, and the MME 135 can perform control plane functions for enabling IP PDN communications with the Internet 155. In one embodiment, the MME 135 can assign one or more bearer gateways 150 and 160 for use in transporting user data to and from the mobile communication device 116. For example, the MME 135 can assign one or more default bearer gateways 150 and 160 and/or one or more dedicated bearer gateways 150 and 160.

In one or more embodiments consistent with the 3GPP standard, after the MME 135 has performed assignment of bearer gateways 150 and 160 for the mobile communication device 116, the MME 135 can further perform updates and handovers on behalf of the mobile communication device 116 as it moves between various LTE-Uu wireless network locations. The MME 135 can assign initial bearer gateways 150 and 160 for the mobile communication device 116 based on location information associated with the mobile communication device 116. However, if the mobile communication device 116 moves to a different location, then the MME 135 can be required to update the assignment of the bearer gateways 150 and 160 to fulfill performance requirements. Hence, the MME 135 can assign and maintain bearer pathways for user data for the mobile communication device 116. In one or more embodiments, the Macro eNodeB 121 can support a tunneling protocol pathway for authentication, control plane, and user plane for the mobile communication device 116.

In one or more embodiments, the MME 135 can also perform functions such as idle mode tracking and paging procedure including retransmissions. The MME 135 can choose an S-GW 150 for the mobile communication device 116. The S-GW 150 can route and forward user data packets, while also acting as the mobility anchor for the user plane during inter-eNodeB handovers and as the anchor for mobility between LTE and other 3GPP technologies. For a wireless communication device 116 in idle state, the S-GW 150 can terminate a downlink data path and can trigger paging when downlink data arrives for the mobile communication device 116. The S-GW 150 can manage and can store contexts, such as parameters of an IP bearer service and/or network internal routing information.

In one or more embodiments, the PDN Gateway (P-GW) 160 can provide user plane connectivity from the mobile communication device 116 to external packet data networks, including the Internet 155, by being the point of exit and entry of traffic for the mobile communication device 116. The mobile communication device 116 can have simultaneous connectivity with more than one P-GW 160 for accessing multiple PDNs. The P-GW 160 can perform policy enforcement, packet filtering for each user, charging support, lawful interception and/or packet screening. The P-GW 160 can also act as the anchor for mobility between 3GPP and non-3GPP technologies such as WiMAX and 3GPP2 (CDMA 1× and EvDO).

In a conventional and simplistic wireless communication LTE core network 100, the MME 135 can be connected to the SCEF 145 in a 1:1 peered mode, as shown. The SCEF 145 could also be connected to one or more external IoT Application Servers 170A-N in a 1:1 peered mode. These connections can enable data transfers associated with each given AS 170. In this simplified arrangement, a NB-IoT device 118 can be attached to the LTE high-speed mobility network to gain services from their target AS 170 in a Home PLMN (HPLMN) network. The NB-IoT device 118 and Macro eNodeB 121 can initiate an attach request procedure and/or PDN connectivity request procedures with the MME 135 for that geographical RAN region. The attach procedure can then authenticate the NB-IoT device 118 prior to establishment of its non-IP PDN data connection towards the SCEF server 145.

In one or more embodiments, prior to the PDN connection establishment for the NB-IoT device 118, the MME 135 should have connectivity with the SCEF 145 using a T6a signaling interface as defined in the 3GPP standards. The T6a interface can be Diameter based and can us SCTP as the transport layer protocol with a defined application identifier. The direct connectivity between MME 135 and SCEF 145 can simplify the overall LTE core network architecture design for NB-IoT device 118 services delivery. In such a paired mode design, the MME 135 and SCEF 145 networking entities can have proper nodal identification, addressing and configuration to be able to exchange bidirectional control plane message exchanges that can enable user payload data transfers. However, a multi-homed network, can result in a much simpler T6a interface SCTP profile, Diameter protocol and application layer definitions, and IP addressing.

In one or more embodiments, the system can include several Macro eNodeB nodes 121 and several NB-IoT Only eNodeB nodes 123. Each Macro eNodeB nodes 121 can support mobile communication devices 116 and NB-IoT devices 118 over its coverage area or region. Each NB-IoT Only eNodeB node 123 can support NB-IoT devices 118 over its coverage area or region. In one embodiment, the coverage areas of the NB-IoT Only eNodeB nodes 123 can overlap all or part of one or more coverage areas of the Macro eNodeB nodes 121. In this way, NB-IoT devices 118 can communicate with a Macro eNodeB node 121 or a NB-IoT Only eNodeB node 123. In one or more embodiments, the system 100 can affect which of the available eNodeB nodes, the Macro eNodeB node 121 or the NB-IoT Only eNodeB node 123 is selected by the NB-IoT devices 118, by adjusting power levels of the signal carriers that broadcast to their respective coverage areas.

In one or more embodiments, the system 100 can begin with Macro eNodeB node 121 generating a first NB-IoT carrier at a first level and NB-IoT Only eNodeB node 123 generating a second NB-IoT carrier at a second level, as shown in FIG. 1A. In this configuration, the Macro eNodeB node 121 and the NB-IoT Only eNodeB node 123 can create a first equilibrium for NB-IoT devices 118 that can receive communications from either of Macro eNodeB node 121 or NB-IoT Only eNodeB node 123.

In one or more embodiments, the IRMS 130 can monitor the Macro eNodeB node 121 and the NB-IoT Only eNodeB node 123 to determine how many NB-IoT devices 118 are coupled to each of the Macro eNodeB and NB-IoT Only eNodeB nodes 123. In one embodiment, IRMS 130 can compare the number of NB-IoT devices 118 that connected to the Macro eNodeB node 121 to a threshold value, such as a maximum number of connected devices. In one embodiment, IRMS 130 can compare the number of NB-IoT devices 118 that connected to the Macro eNodeB node 121 to a multiple threshold values, such as a maximum number of connected devices and/or a minimum number of connected devices. In one embodiment, if the number of NB-IoT devices 118 exceeds the threshold, then the IRMS 130 can direct or command the Macro eNodeB 121 to reduce the power of the first NB-IoT Carrier as shown in FIG. 1B. As a result the second NB-IoT Carrier that is generated by the NB-IoT Only eNodeB node 123 is relatively stronger than that of the first NB-IoT Carrier of the Macro eNodeB 121. NB-IoT devices 118 that are present in areas of coverage overlap will sense the change in relative NB-IoT Carrier strength and request handovers from the Macro eNodeB 121 to the NB-IoT Only eNodeB 123. In this way, the system 100 can both dynamically monitor NB-IoT device 118 loading and dynamically alter this loading.

Figure 1C:
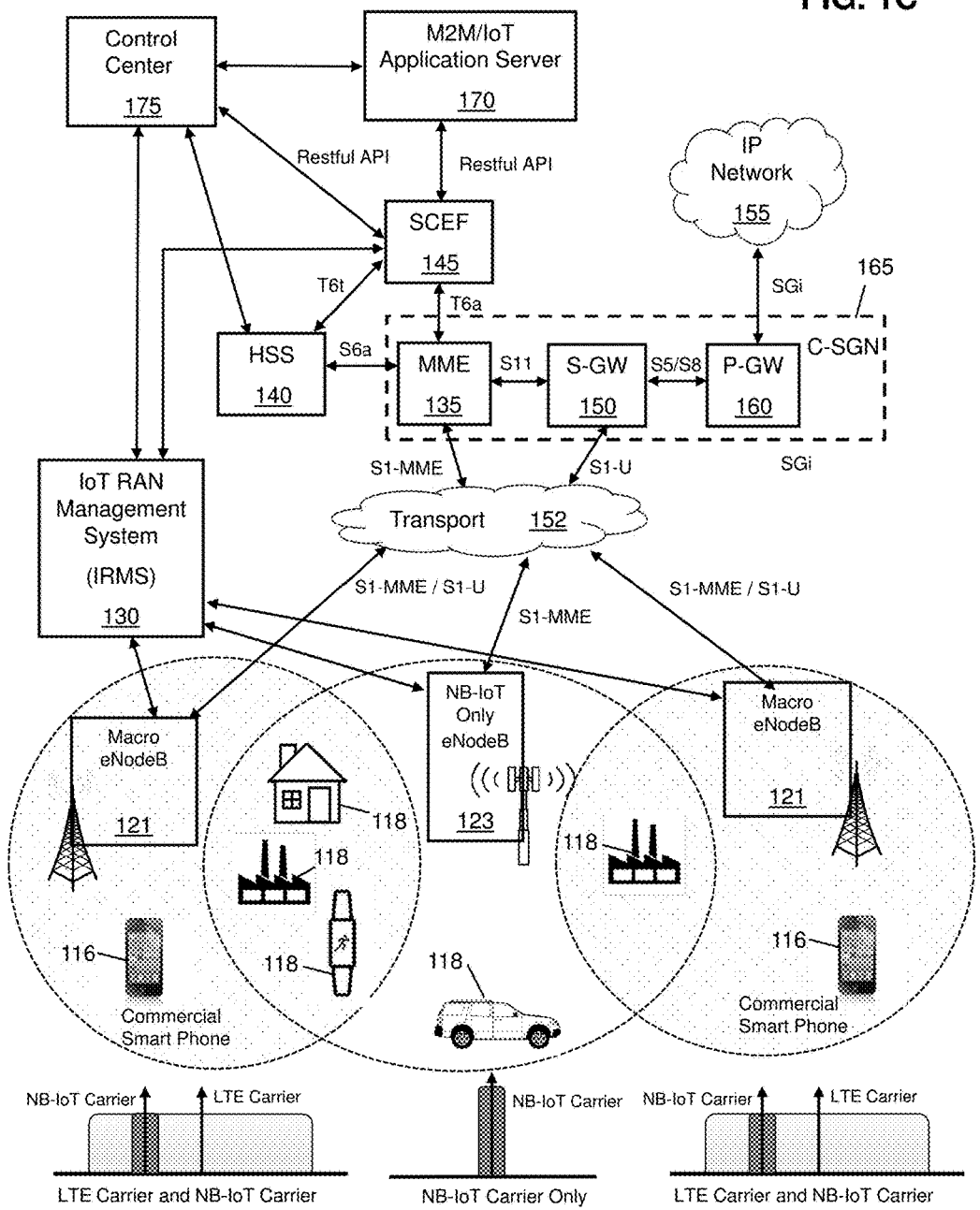

In one or more embodiments, if the number of NB-IoT devices 118 exceeds the threshold, then, rather than the IRMS 130 directing the Macro eNodeB 121 to reduce the power of the first NB-IoT Carrier as shown in FIG. 1B, the IRMS 130 can direct the NB-IoT Only eNodeB 123 to increase the power of the second NB-IoT Carrier as shown in FIG. 1C. Again, the second NB-IoT Carrier that is generated by the NB-IoT Only eNodeB node 123 will be relatively stronger than that of the first NB-IoT Carrier of the Macro eNodeB 121. NB-IoT devices 118 that are present in areas of coverage overlap will again sense the change in relative NB-IoT Carrier strength and request handovers from the Macro eNodeB 121 to the NB-IoT Only eNodeB 123.

Figure 1D:
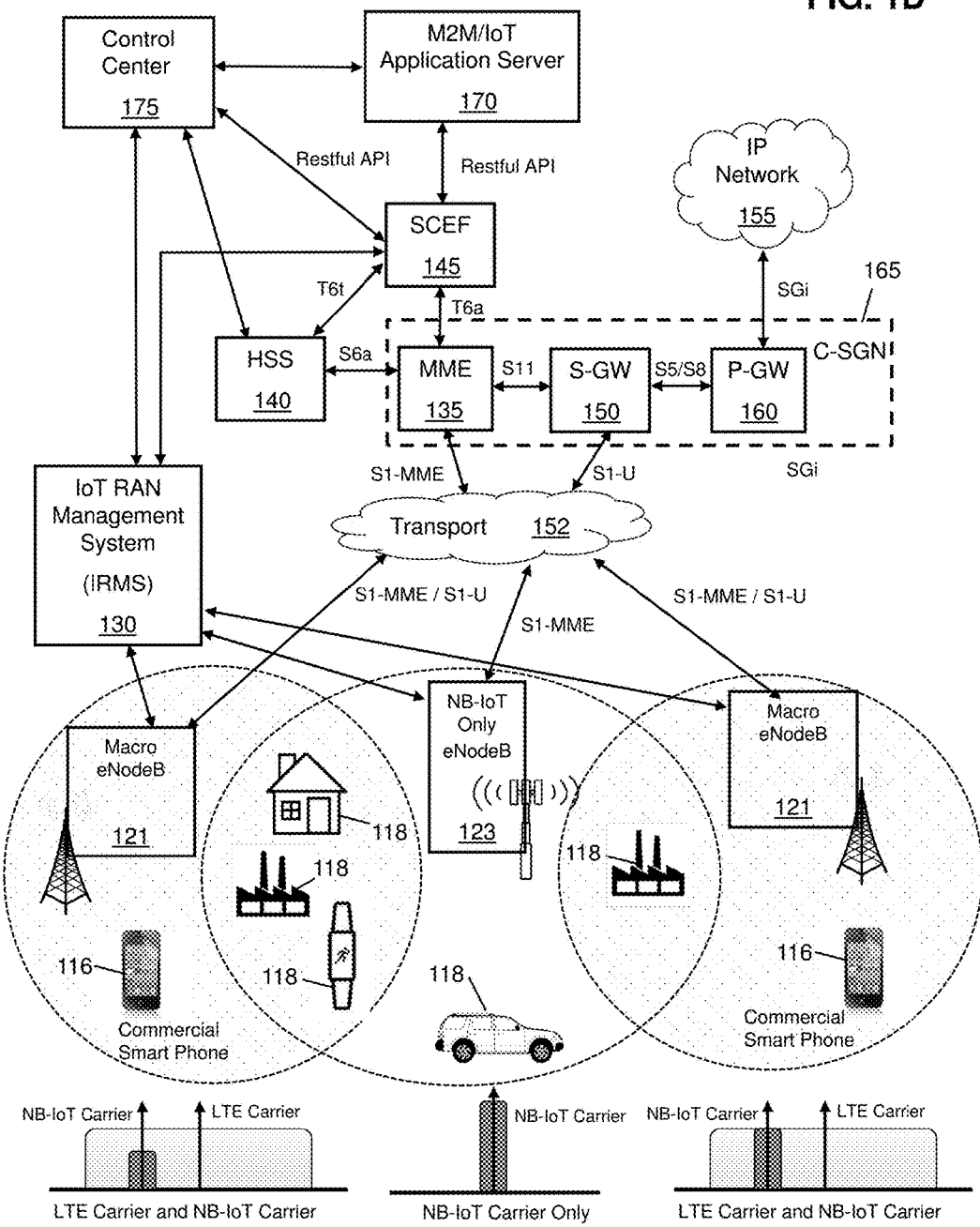

In one or more embodiments, if the number of NB-IoT devices 118 exceeds the threshold, then, the IRMS 130 can direct the Macro eNodeB 121 to reduce the power of the first NB-IoT Carrier and direct the NB-IoT Only eNodeB 123 to increase the power of the second NB-IoT Carrier as shown in FIG. 1D. The second NB-IoT Carrier that is generated by the NB-IoT Only eNodeB node 123 will be much stronger than that of the first NB-IoT Carrier of the Macro eNodeB 121. NB-IoT devices 118 that are present in areas of coverage overlap will sense a large change in relative NB-IoT Carrier strength and request handovers from the Macro eNodeB 121 to the NB-IoT Only eNodeB 123.

In one or more embodiments, once the IRMS 130 has determined that the number of NB-IoT devices 118 exceeds the maximum threshold, then the IRMS 130 can further determine if the NB-IoT Only eNodeB 123 has available capacity to take on additional NB-IoT devices 118. For example, the IRMS 130 can compare the number of NB-IoT devices 118 currently connected to the NB-IoT Only eNodeB 123 to a threshold value, such as a maximum number of connected devices and/or a minimum number of connected devices. In one embodiment, if the number of NB-IoT devices 118 is below the threshold, then the IRMS 130 can determine that the NB-IoT Only eNodeB 123 has available capacity. The IRMS 130 can use this information to condition the directing or commanding the Macro eNodeB 121 to reduce the power of the first NB-IoT Carrier and/or the NB-IoT Only eNodeB 123 to increase power of the second NB-IoT Carrier. As a result, the IRMS 130 can avoid transferring NB-IoT devices 118 from the Macro eNodeB 121 to the NB-IoT Only eNodeB 123 when the NB-IoT Only eNodeB 123 does not have additional capacity to absorb the offloaded devices 118. In one or more embodiments, the IRMS 130 can use the relative number of NB-IoT devices 130 connected to the Macro eNodeB 121 and/or the NB-IoT Only eNodeB 123 to determine how much to adjust the first NB-IoT Carrier and/or the second NB-IoT Carrier.

In one or more embodiments, IRMS 130 can receive information associated with one or more Application Servers (AS) 170. In one embodiment, a Service Capability Exposure Function (SCEF) server 145 can interface between the AS 170 and the MME 135 to enable transfer of data between the NB-IoT devices 118 and one or more AS 170 using the control path of the mobile communication network. In one embodiment, the SCEF server 145 can receive information from an AS 170 regarding future or expected provisioning of upgrades to the NB-IoT devices 118. For example, an AS 170 can report to the SCEF server 145 about an expected software or firmware upgrade to NB-IoT devices 118 that will require transmitting the upgrade data to the NB-IoT devices 118 via the Macro eNodeB nodes 121 and/or the NB-IoT Only eNodeB nodes 123. In one embodiment, the SCEF server 145 can transmit the information regarding expected upgrades to the IRMS 130. In another embodiment, a Control Center 175 can collect the information from the SCEF server 145 or from the AS 170 directly.

In one or more embodiments, the IRMS 130 can determine, from the information regarding the expected upgrades, what type or class of NB-IoT devices 118 are being upgraded in the geographic region. Based on the type of NB-IoT devices 118 and the geographic region, the IRMS 130 can correlate the device type and geographic region information to determine which Macro eNodeB nodes 121 and/or NB-IoT Only eNodeB nodes 123 will need to carry the upgrade data to the NB-IoT devices 118. In one embodiment, the IRMS 130 can query the HSS 140 to identify the NB-IoT devices 118 and/or the Macro eNodeB nodes 121 and/or NB-IoT Only eNodeB nodes 123. In one or more embodiments, the IRMS 130 can identify the Macro eNodeB nodes 121 and/or NB-IoT Only eNodeB nodes 123 that are required for the expected upgrade. The IRMS 130 can also identify NB-IoT Only eNodeB nodes 123 that are neighbors to the Macro eNodeB nodes 121, so that the IRMS 130 can offload NB-IoT devices 118 from the Macro eNodeB nodes 121 to the NB-IoT Only eNodeB nodes 123.

In one or more embodiments, the IRMS server 130 can gather commercial (CAT3/4) device type and NB-IoT device 118 type statistics from the Macro eNodeB nodes 121 and the NB-IoT-Only-eNodeB nodes 123. The IRMS server 130 can determine the transmit power requirements for the dynamically adjusting NB-IoT Carrier levels at the Macro eNodeB nodes 121 and/or the NB-IoT-Only-eNodeB nodes 123. The IRMS server 130 can correlate NB-IoT devices 118 to map geographic regions to cell sites. In one or more embodiments, the Macro eNodeB nodes 121 can include an IRMS function to monitor active/connected NB-IoT device types and/or commercial subscriber traffic and can send statistics to the IRMS server 130 regarding the type of devices that these Macro eNodeB nodes 121 are serving. The IRMS function in the Macro eNodeB nodes 121 can also communicate with internal Remote Radio Heads (RRH) to update transmit power requirements for the NB-IoT Carrier as received from IRMS Server 130. In one or more embodiments, an Interface between IRMS server 130 and the Control Center 175 and/or the SCEF 145 can be used for information related to scheduled OTA firmware/software upgrades for NB-IoT device types in a given geographic region.

In one or more embodiments, an IRMS function on the Macro eNodeB 121 and/or the NB-IoT Only eNodeB 123 can communicate with the IRMS Server 130 by sending statistics related to active/connected device types and/or by receiving instruction on the power management for the NB-IoT Carrier. The NB-IoT Carrier can be deployed in-band (overlay), guard band and standalone, and the solution is applicable to all such deployment scenarios. In one or more embodiments, the IRMS server 130 can gather information associated with the NB-IoT devices 118 and the commercial or mobile communication devices 116 that are connected via the Radio Access Network so that the IRMS server 130 can have up-to-date statistics on the number of active/connected NB-IoT and/or commercial devices on a cell site.

In one or more embodiments, the IRMS Server 130 can interface with the Control Center (CC) 175 and/or the SCEF server 145, such that the CC 175 can inform the IRMS server 130 of any scheduled Firmware/Software OTA upgrade in a certain geographical region. The IRMS server 130 can, in turn, take proactive action to dynamically adjust routing of the NB-IoT devices 118 by analyzing current load factor on the Macro eNodeB 121. If the Macro eNodeB 121 supports multiple carriers, then load factors can be generated accordingly per radio-carrier. In one or more embodiments, the IRMS server 130 can recognize when the Macro eNodeB 121 needs to offload NB-IoT devices 130. In this situation, the IRMS server 130 can poll neighboring NB-IoT-Only-eNodeB nodes 123 to obtain NB-IoT device 118 statistics. If the NB-IoT Only eNodeB 123 has sufficient capacity, then the IRMS server 130 can signal the Macro eNodeB 121 and/or the NB-IoT Only eNodeB 123 to manages NB-IoT Carrier power requirements and, in turn, cause offloading of NB-IoT devices 118 to the NB-IoT Only eNodeB nodes 123.

A similar mechanism can be used to move NB-IoT devices 118 back to the macro eNodeB nodes 123 when the loading conditions change.

In one or more embodiments, the approach can be dynamically adapted on a per-carrier basis between the nodes, and can provide resiliency to NB-IoT devices 118, especially where the cost and functionality restrictions on NB-IoT devices 118 mean that these devices may not support typical mobility handover procedures. The proposed solution can be used for other LPWA (Low Power Wide Area) technologies such as Sigfox™ and LoRa™, which typically operate in the unlicensed spectrum and which can experience higher radio interference than 3GPP technologies operating in the licensed spectrum. NB-IoT devices 118 can be handed over to more appropriate access points in such scenarios.

Figure 2:
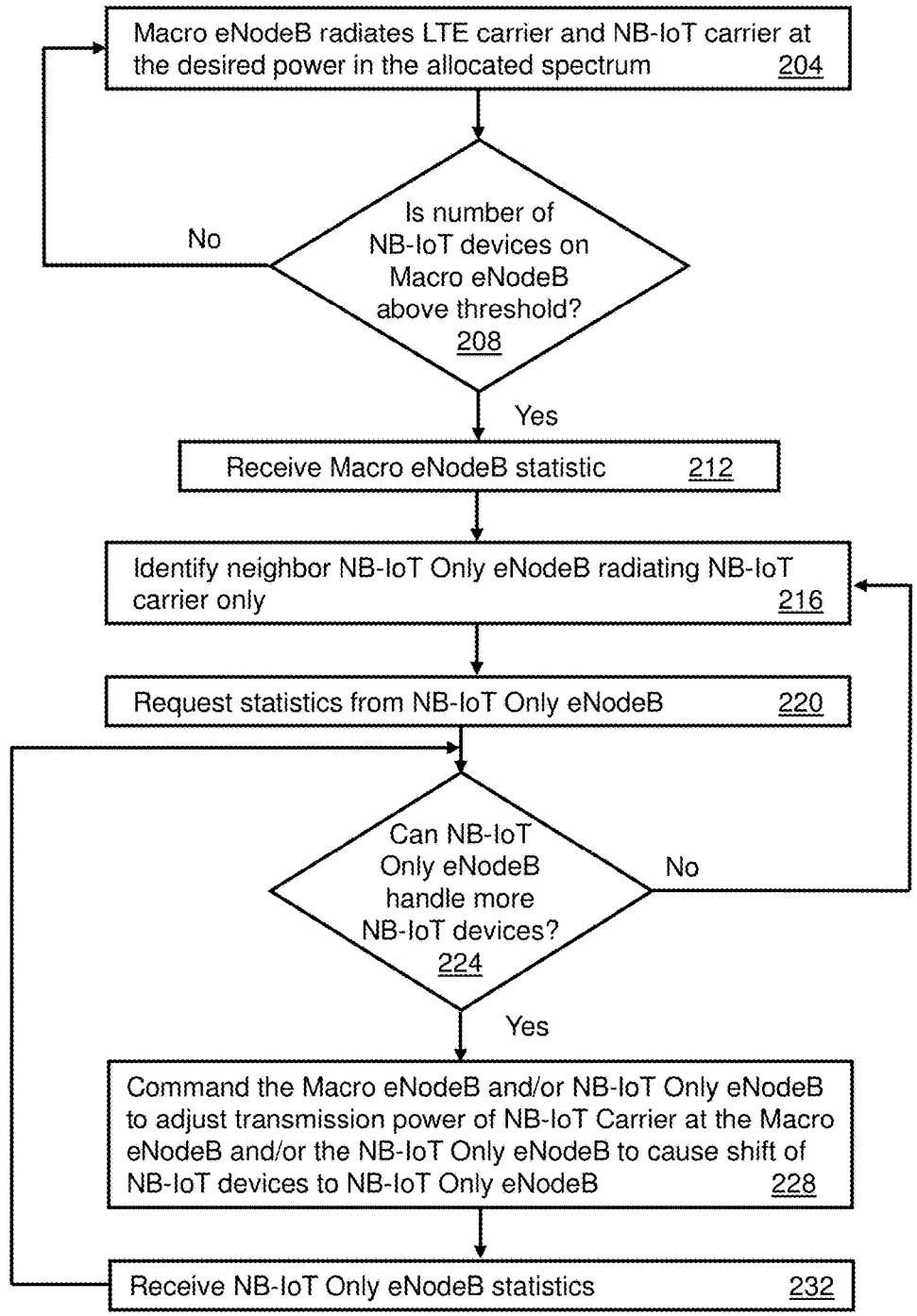
FIG. 2-3 depicts illustrative embodiments of method used in portions of the systems described in FIGS. 1A-1D.

FIG. 2 depicts an illustrative embodiment of a method 200 used in portions of the described in FIGS. 1A-D for dynamically routing NB-IoT devices in a mobile communication network. In step 204, the Macro eNodeB can radiate both the LTE Carrier and the NB-IoT Carrier as the desired power in the allocated spectrum. The Macro eNodeB can monitor the number and type of devices that are connected to the mobile communication network through the Macro eNodeB. In one embodiment, the Macro eNodeB can report the number and type of connected devices to the IRMS server as a set of statistics. The IRMS server 130 can then determine whether the number of NB-IoT devices that are connected to the Macro eNodeB is above the threshold in step 208. In one embodiment, the Macro eNodeB can determine whether the number of NB-IoT devices is above the threshold and can then, in turn, report to the IRMS server whether the Macro eNodeB is operating above threshold in step 212.

If the Macro eNodeB is above threshold in step 208 then the IRMS server receives the Macro eNodeB statistic in step 212, then, in step 216, the IRMS server can identify one or more neighboring or proximate NB-IoT Only eNodeB nodes that only radiate the NB-IoT Carrier. In step 220, the IRMS server 130 can request statistics from the NB-IoT Only eNodeB and, in step 224, can determine whether the NB-IoT Only eNodeB has capacity for additional NB-IoT devices If the NB-IoT Only eNodeB has capacity, then the IRMS server can command the Macro eNodeB and/or the NB-IoT Only eNodeB to adjust transmission power of the NB-IoT Carrier and the Macro eNodeB and/or the NB-IoT Only eNodeB to cause a shift in NB-IoT devices between Macro eNodeB and/or the NB-IoT Only eNodeB in step 228. In step 232, the IRMS server can continue to receive NB-IoT Only eNodeB statistics to determine if the additional modification of relative levels of the NB-IoT Carrier.

Figure 3:
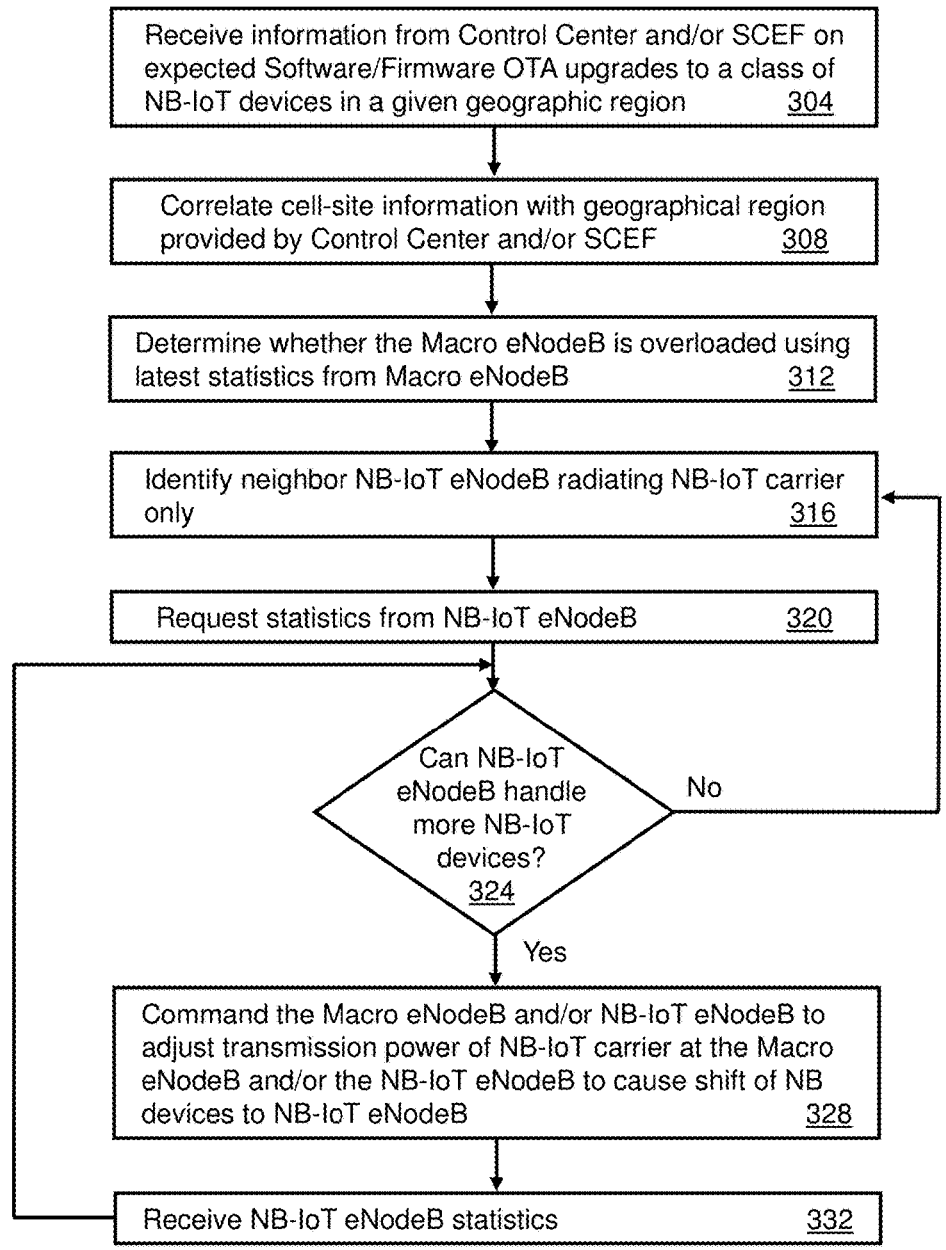

FIG. 3 depicts an illustrative embodiment of another method 300 used in portions of the described in FIGS. 1A-D for dynamically routing NB-IoT devices in a mobile communication network. In step 304, the IRMS server can receive information from the Control Center and/or the SCEF regarding expected over-the-air upgrades that are planned. The upgrades can include software/firmware associated with the NB-IoT devices that will be delivered to the NB-IoT devices via eNodeB devices. In step 308, the IRMS server can correlate cell-site information with geographical region information of the NB-IoT device that is provided by the Control Center. The IRMS server can, in turn, use the cell site information to identify whether the Macro eNodeB is overloaded in step 312.

In step 316, the IRMS server can identify one or more neighboring or proximate NB-IoT Only eNodeB nodes that only radiate the NB-IoT Carrier. In step 320, the IRMS server can request statistics from the NB-IoT Only eNodeB and can determine whether the NB-IoT Only eNodeB has capacity for additional NB-IoT devices, in step 324. If the NB-IoT Only eNodeB has capacity, then the IRMS server can command the Macro eNodeB and/or the NB-IoT Only eNodeB to adjust transmission power of the NB-IoT Carrier and the Macro eNodeB and/or the NB-IoT Only eNodeB to cause a shift in NB-IoT devices between Macro eNodeB and/or the NB-IoT Only eNodeB in step 328. In step 232, the IRMS server can continue to receive NB-IoT Only eNodeB statistics to determine if the additional modification of relative levels of the NB-IoT Carrier in 332.

While for purposes of simplicity of explanation, the respective processes are shown and described as a series of blocks in FIGS. 2 and 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
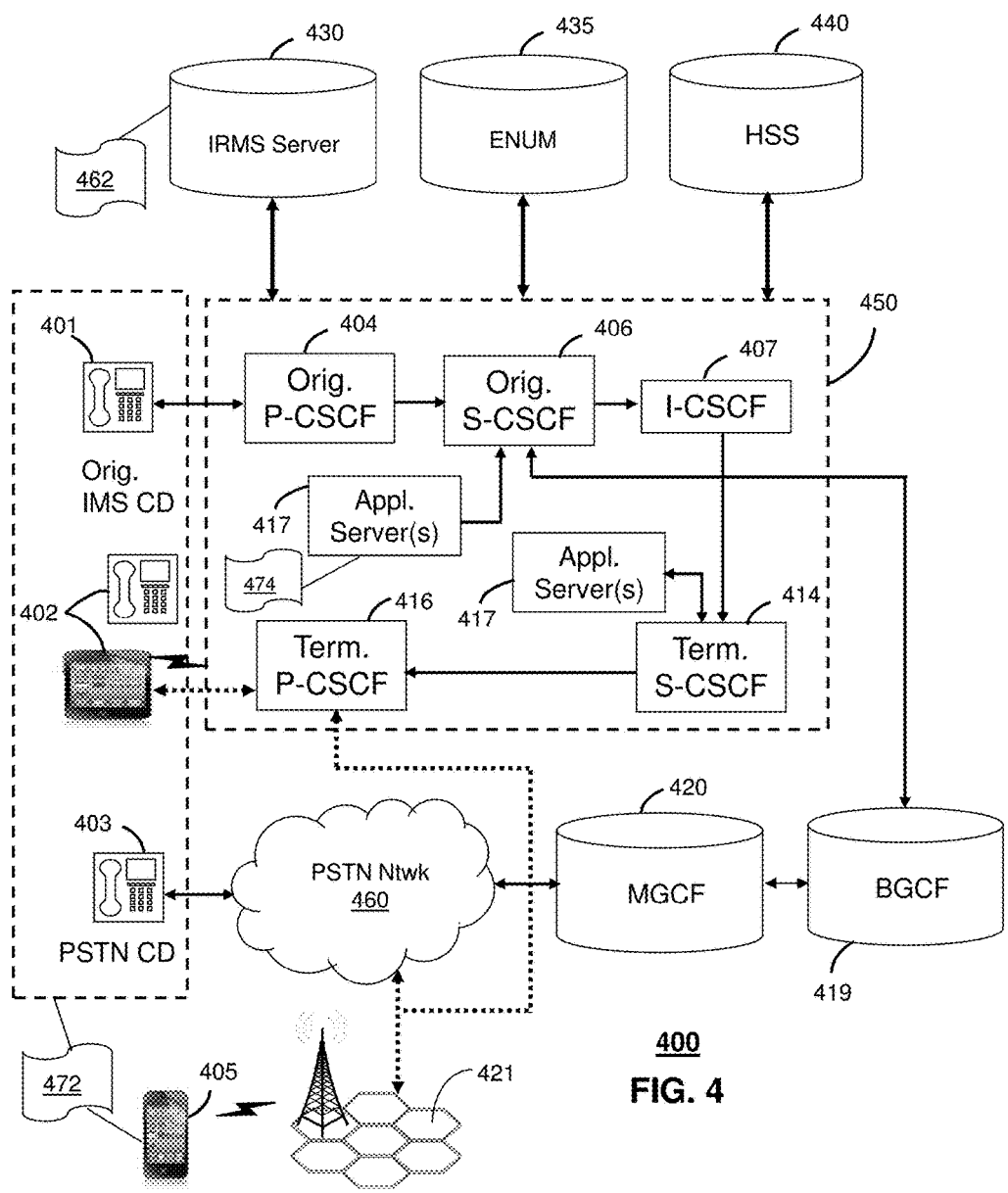
FIG. 4 depicts illustrative embodiments of a communication system that provides communication and media services for communication devices according to embodiments illustrated in FIGS. 1A-1D.

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIGS. 1A-1D and communication system 400 as another representative embodiment of communication system 400 for providing dynamic routing of NB-IoT device traffic in a mobile communication device.

Communication system 400 can comprise a Home Subscriber Server (HSS) 440, a tElephone NUmber Mapping (ENUM) server 435, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (AS) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 435 to translate an E. 164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services.

If the terminating communication device is instead a PSTN CD such as CD 403 or CD 405 (in instances where the cellular phone only supports circuit-switched voice communications), the ENUM system 435 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The IRMS 430 of FIG. 4 can be operably coupled to communication system 400 for purposes similar to those described above. IRMS 430 can perform function 462 and thereby provide NB-IoT device routing services to the CDs 401, 402, 403 and 405 of FIG. 4, similar to the functions described for server 130 of FIGS. 1A-1D in accordance with methods 200-300 of FIGS. 2-3. CDs 401, 402, 403 and 405, which can be adapted with software to perform function 472 to utilize the services of the IRMS 430, similar to the functions described for communication devices 116 and 118 of FIGS. 1A-1D in accordance with method methods 200-300 of FIGS. 2-3. IRMS 430 can be an integral part of the application server 417 performing function 474, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
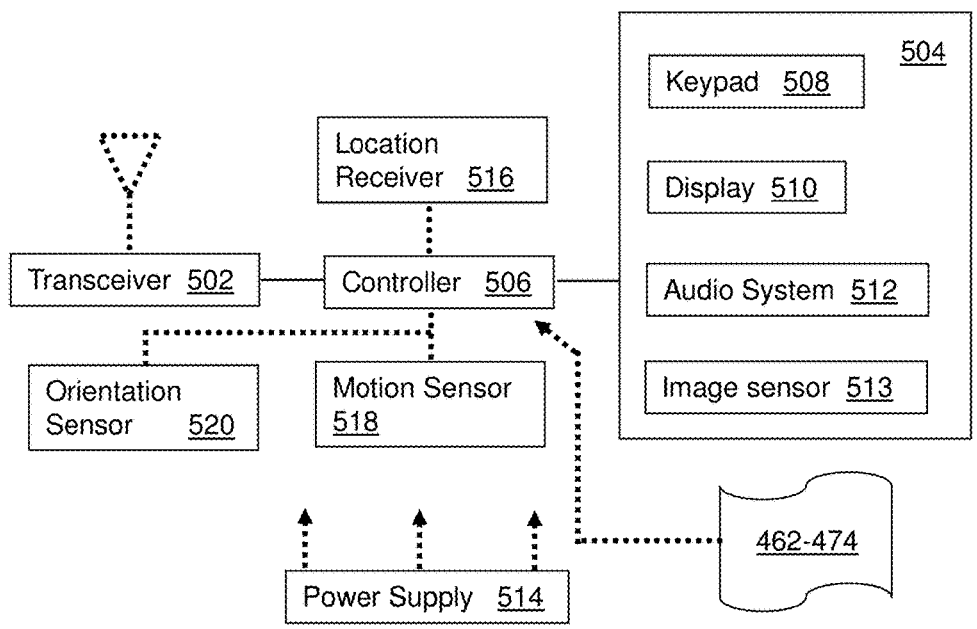
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1A-1D, and FIG. 4 and can be configured to perform portions of methods 200-300 of FIG. 2-3.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices of FIGS. 1A-1D, a media processor, media devices, or the portable communication devices 116 of FIGS. 1A-1D, as well as the IMS CDs 401-402 and PSTN CDs 403-405 of FIG. 4. It will be appreciated that the communication device 700 can also represent other devices that can operate in systems of FIGS. 1A-1D, communication system 400 of FIG. 4 such as a gaming console and a media player. In addition, the controller 406 can be adapted in various embodiments to perform the functions 462-474, respectively.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
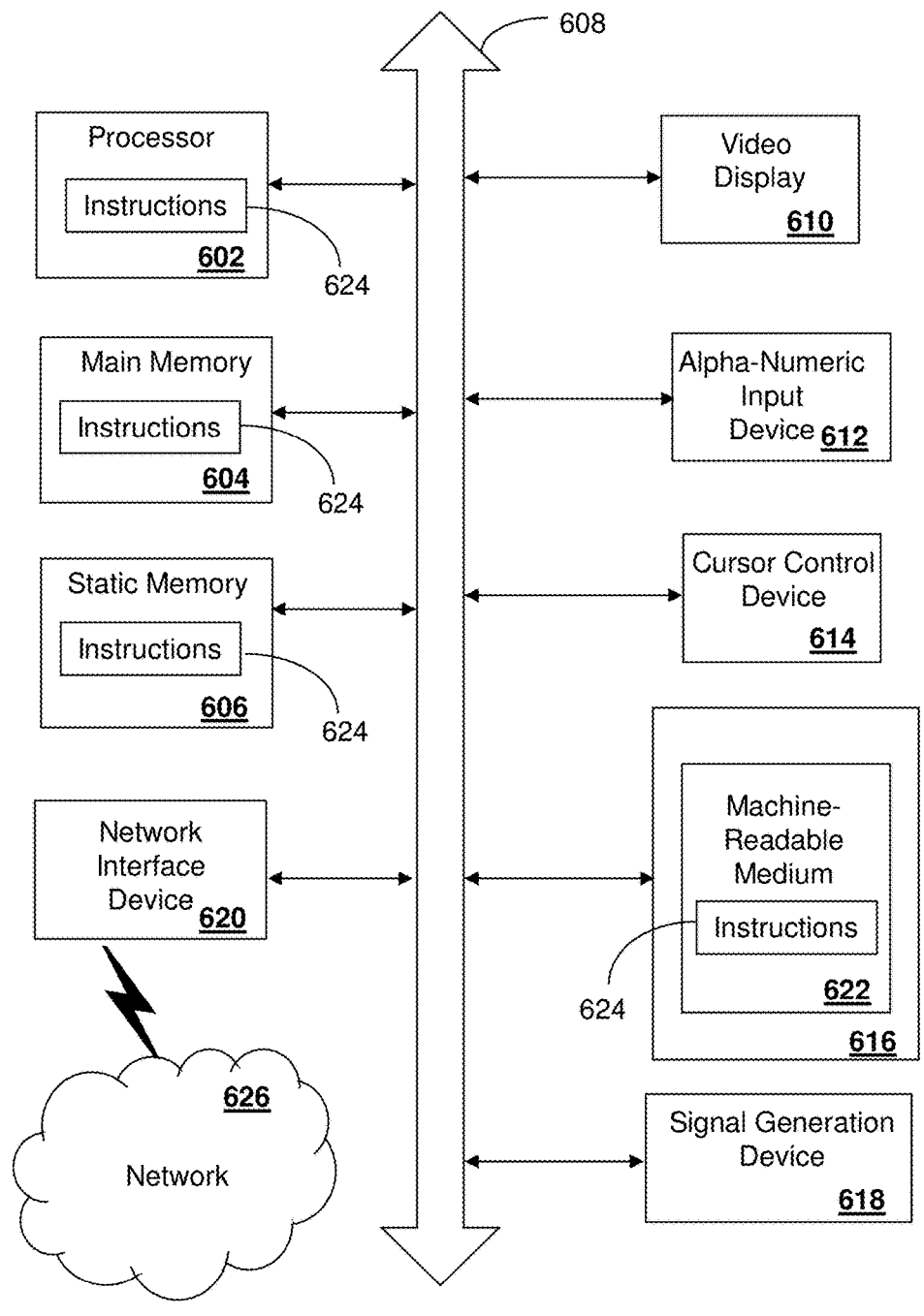
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the IRMS 430, the media processor, the NB-IoT device 118, and mobile communication device 116. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
    a processing system including a processor;
    a memory that stores executable instructions operating as a service capability exposure function that, when executed by the processing system, facilitate performance of operations, comprising:
    identifying a plurality of narrow band wireless devices connected to a first radio access node of a mobile communication network according to statistics associated with the first radio access node;
    determining a projected loading for the first radio access node to provision the plurality of narrow band wireless devices with an expected upgrade;
    determining whether the first radio access node would be overloaded according to the projected loading;
    identifying a second radio access node of the mobile communication network responsive to determining that the first radio access node would be overloaded, wherein the second radio access node supports narrow band wireless devices and wherein the second radio access node is proximate to the plurality of first radio access node; and
    commanding the second radio access node to increase output power to cause a first narrow band wireless device of the plurality of narrow band wireless devices to transition from connection with the first radio access node to connection with the second radio access node.

2. The server of claim 1, wherein the operations further comprise commanding the first radio access node to reduce output power to cause the first narrow band wireless device of the plurality of narrow band wireless devices to transition from connection with the first radio access node to connection with the second radio access node.

3. The server of claim 2, wherein the operations further comprise receiving information associated with the expected upgrade from an application server to the plurality of narrow band wireless devices that are connected to the mobile communication network.

4. The server of claim 3, wherein the information associated with the expected upgrade is collected from an application server by a control center.

5. The server of claim 3, wherein the operations further comprise identifying a geographical area associated with the plurality of narrow band wireless devices according to the information associated with the expected upgrade.

6. The server of claim 3, wherein the information associated with the expected upgrade is collected from an application server by a service capability exposure function server.

7. The server of claim 6, wherein the expected upgrade is delivered to the narrow band wireless devices via a control plane of the mobile communication network via a service capability exposure function.

8. The server of claim 1, wherein the operations further comprise:
receiving second statistics associated with the first radio access node; and
determining, from the second statistics, whether increased output power commanded at the second radio access node caused the first narrow band wireless device to transition.

9. The server of claim 8, wherein the operations further comprise commanding the second radio access node to increase the output power responsive to determining that the increase output power commanded at the second radio access node did not cause the first narrow band wireless device to transition.

10. The server of claim 1, wherein the first radio access node generates a wide-band carrier and a narrow-band band carrier, and wherein the second radio access node generates a narrow-band carrier but does not generate a wide-band carrier.

11. The server of claim 1, wherein the operations further comprises determining if the second radio access node has available capacity, and wherein the second radio access node is identified responsive to determining that the second radio access node has available capacity.

12. A machine-readable storage medium, comprising executable instructions that, when executed by a processing system including a processor, facilitate performance of operations at a server, comprising:
receiving information associated with a first radio access node of a mobile communication network, wherein the information describes a plurality of narrow band wireless devices that are connected to the first radio access node, and wherein the information includes a projected loading of the first radio access node based on an expected upgrade to the plurality of narrow band wireless devices;
determining that the first radio access node would be overloaded according to the information associated with the first radio access node;
identifying a second radio access node of the mobile communication network that supports narrow band wireless devices responsive to determining that the first radio access node would be overloaded; and
commanding the second radio access node to increase output power to cause a first narrow band wireless device of the plurality of narrow band wireless devices to transition from connection with the first radio access node to connection with the second radio access node.

13. The machine-readable storage medium of claim 12, wherein the operations further comprise determining, from the information associated with the first radio access node, whether the plurality of narrow band wireless devices connected to the first radio access node exceeds a threshold.

14. The machine-readable storage medium of claim 12, wherein the operations further comprise determining whether the second radio access node is proximate to the first radio access node.

15. The machine-readable storage medium of claim 12, wherein the operations further comprise commanding the first radio access node to reduce output power to cause the first narrow band wireless device of the plurality of narrow band wireless devices to transition from connection with the first radio access node to connection with the second radio access node.

16. The machine-readable storage medium of claim 12, wherein data is delivered to the narrow band wireless devices via a control plane of the mobile communication network via a service capability exposure function.

17. The machine-readable storage medium of claim 12, wherein the first radio access node generates a wide-band carrier and a narrow-band band carrier, and wherein the second radio access node generates a narrow-band carrier but does not generate a wide-band carrier.

18. The machine-readable storage medium of claim 12, wherein the operations further comprises determining if the second radio access node has available capacity, wherein the second radio access node is identified responsive to determining that the second radio access node has available capacity.

19. A method, comprising:
identifying, by a processing system including a processor, a first radio access node of a mobile communication network that would be overloaded according to information associated with a plurality of narrow band wireless devices connected to the first radio access node, wherein the information includes a projected loading of the first radio access node based on an expected upgrade to the plurality of narrow band wireless devices;
identifying, by the processing system, a second radio access node of the mobile communication network responsive to determining that the first radio access node would be overloaded; and
commanding, by the processing system, the second radio access node to increase output power to cause a first narrow band wireless device of the plurality of narrow band wireless devices to transition from connection with the first radio access node to connection with the second radio access node.

20. The method of claim 19, further comprising commanding, by the processing system, the first radio access node to reduce output power to cause the first narrow band wireless device of the plurality of narrow band wireless devices to transition from connection with the first radio access node to connection with the second radio access node.

* * * * *